United States Patent Office 3,676,079
Patented July 11, 1972

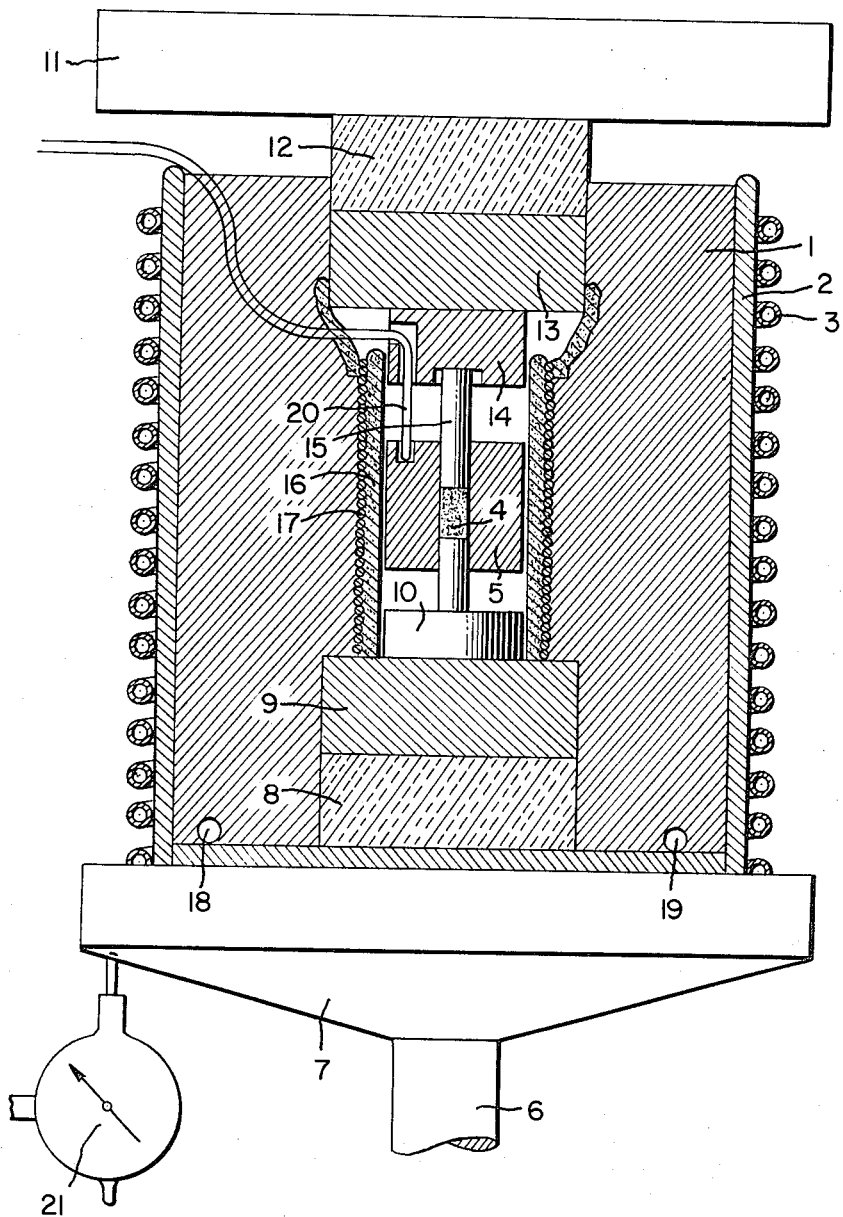

3,676,079
PRESSURE CALCINTERING
Peter E. D. Morgan, Ithaca, N.Y., assignor to
Research Corporation, New York, N.Y.
Filed Mar. 28, 1966, Ser. No. 538,036
Int. Cl. C01f 1/00, 15/00; C22c 1/04
U.S. Cl. 23—345
10 Claims

ABSTRACT OF THE DISCLOSURE

Finely-grained ceramic magnesium, aluminum or thorium oxide having an actual density approaching the theoretical density is prepared by heating the corresponding substantially pure hydroxide maintained at a pressure above 1500 p.s.i. to a temperature above its decomposition temperature while permitting water vapor to escape as it is formed.

---

This invention relates to metal oxides of ceramic interest. In one specific aspect, it relates to a novel method for the preparation of metal oxides having a very fine grain size and an actual density very close to the theoretical.

Sinterable pure oxide powders of very fine grain size have been prepared by the pyrolysis of metal hydroxides, carbonates, oxalates, alkoxides, and the like, preferably in vacuo. The resultant oxide has a large excess surface free energy and hence a propensity to sintering. Very fine crystallites of the oxide generally nucleate on the parent crystal in a preferred orientation with respect to the latter. As the temperature is raised, these crystallites agglomerate and sinter and the mass becomes progressively more inactive towards subsequent sintering.

It is not always possible to take advantage of the most reactive, fine-grained material that can be prepared for conventional cold-pressing and sintering reactions. The cold pressing properties of the fine grained material may be poor or uneven grain growth may occur. Certain regions of the solid mass may shrink more rapidly than others, at the same time crystallizing and leaving voids within the grains.

I have discovered that fine-grain sized metal oxides having an actual density approaching the theoretical can be prepared by heating an oxide precursor under pressure in order to densify the oxide at the same time it is produced. Treating the oxide in such a manner, during calcination, allows the use of lower temperatures, pressures and/or reaction times to achieve very highly dense and translucent products. The very fine grain size of the oxide is retained and products having high mechanical strengths are obtained. The term "pressure calcintering" has been coined to describe the simultaneous calcination and sintering under pressure of a decomposing powder.

It is, therefore, a principal object of the present invention to achieve ceramic oxide materials of high strength and very fine grain size and an actual density approaching the theoretical utilizing the super-reactivity of a decomposing power. (Chemical and surface activation.)

The present invention is a method for the preparation of a finely-grained, ceramic metal oxide having an actual density approaching the theoretical which comprises heating a metal oxide precursor at a temperature above that at which decomposition occurs and at a pressure above 1500 p.s.i., said precursor decomposing under these conditions to form only the metal oxide and vaporous by-products.

The metal oxide precursor starting materials for use in the process of the present invention are compounds of a metal which decompose on heating to form the metal oxide and a vaporous or gaseous by-product. While the hydroxide is most often utilized, salts such as the oxalates, carbonates, peroxides, basic chlorides, basic nitrates, and the like, may also be employed as the metal oxide precursor. The precursor must decompose without forming a liquid under the temperature and pressure conditions employed to form the oxide. The choice of precursor will be very dependent on the oxide ceramic to be produced. In general, the following features are desirable:

(A) As low a mass loss in decomposition as possible.
(B) A radical crystal transformation.
(C) Facile gas escape in the late stages of the densification.
(D) A degree of reversibility in the reaction

PRECURSOR → OXIDE PRODUCT + GAS

The choice of the particular precursor employed will vary depending on the properties to be achieved in the oxide product.

The decomposition of representative precursors is illustrated by means of the following equations:

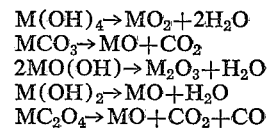

$$M(OH)_4 \rightarrow MO_2 + 2H_2O$$
$$MCO_3 \rightarrow MO + CO_2$$
$$2MO(OH) \rightarrow M_2O_3 + H_2O$$
$$M(OH)_2 \rightarrow MO + H_2O$$
$$MC_2O_4 \rightarrow MO + CO_2 + CO$$

M symbolizes metals such as Mg, Al, Th, U, Pu, Zr, Be and the like. Precursors of the type: $M_1M_2(OH)_2$, $M_1M_2CO_3$, et cetera, wherein $M_1$ and $M_2$ represent different metals in the same crystal structure appear to be of great value in achieving more complex ceramic oxide types for use in magnetic, ferroelectric and similar systems.

As the hydroxide or other precursor decomposes under the influence of heat, very small nuclei of the product, of the order of tens of angstrom units in size, are generated on the precursor. These micro-particles are simultaneously subjected to stress tending to densify them by a massive rheological deformation. In addition, the very fine materials have a very large excess surface free energy which is available as a driving force for bonding and strengthening the oxide as it sinters. Diffusion mechanisms involved appear to be related to those which occur in the calcination and sintering of loose powders except that in this case they are stress directed.

The generation of a gas such as water vapor by decomposition of the oxide precursor under these conditions purges the system of air and, in the case of certain oxides further enhances sintering. The gas or vapor escapes without the necessity for applying a vacuum as in prior processes. Allowing the ready escape of the gaseous or vaporous by-product yields products of high density. When such products are used at higher temperatures they show very little of the bloating which commonly mars the performance of conventional hot pressed ceramic materials.

As stated above a driving force for sintering is the excess surface free energy that a powder has over the corresponding consolidated body. The particles must be as small as possible in order to maximize this force. The micro-particles used in the process of the present invention are those freshly nucleating from a decomposing precursor; additional driving force is provided mechanically by the application of pressure. As the decomposition draws to an end, the rate of densification becomes dependent on the length of the diffusion path, a function of the grain size, since the rate of densification is inversely proportional to grain diameter taken to the second or third power and hence increases very rapidly as the grain size decreases, the micro-particles are rapidly densified.

The beneficial advantages of pressure calcintering are obtained only when calcination and sintering are performed at the same time on a decomposing powder under pressure. The transitory super-activity thus achieved allows the attainment of a highly densified oxide in a one stage operation, and at lower temperatures and pressures than heretofore have been employed.

The process of the present invention is particularly useful in the preparation of non-porous, high density ceramics materials such as are required in nuclear and electronic applications. The process of the invention is also useful where control of grain size is extremely important and may be employed in the preparation of composite oxides and cermet materials for high temperature and/or for nuclear or electronic applications.

My invention is further illustrated by means of the following discussion and examples illustrating specific embodiments of the invention and by means of the accompanying drawing showing a sectional view of the apparatus employed in making the experiments described below. The apparatus was of conventional design.

Referring to the drawing, the central core of the apparatus is thermally insulated by alumina bubble 1 in a brass container 2 provided with external coils 3 for the passage of cooling water. The powder sample 4 to be pressure calcintered is located in the "floating" die 5. Pressure is maintained on the sample at a fixed value by means of a hydraulic pump equipped with a variable by-pass valve (not shown) which actuates a ram 6 attached to the bottom of movable platen 7. Pressure is applied to both ends of the sample 4 by means of the plungers 10 and 15. Pressure at the lower end is transmitted from the movable platen 7 through insulating bricks 8 and 9 to graphite plunger 10 in contact with the sample. Pressure at the other or upper end is transmitted via the fixed top platen 11 insulating bricks 12 and 13, graphite block 14 and graphite plunger 15.

The die and sample are enclosed in an alumina core 16 wound with platinum-rhodium or kanthal heating wire 17. The rate of heating is controlled by a variable speed motor geared to a powerstat to provide a linear rate of heating.

The die is first filled with the sample to be pressure calcintered while on a vibrating table in order to get good compaction of the powder. The sample is preferably cold-pressed before inserting the die into the apparatus. Argon is flushed through the apparatus via ports 18 and 19 and pressure is applied to the sample in the manner described above. The temperature, measured by thermocouple 20, is then slowly raised. Platen movement, usually about 1.5 cm., is measured by means of dial guage 21; or a differential transformer signal may be recorded on a chart recorder (not shown).

Because of the thermal expansion of the parts being heated, a correction factor is obtained by blank runs under the same conditions. Taking the correction factor into account, the final reading corresponds to the length of the pellet after removal from the apparatus. Using 3″ diameter dies made of high purity graphite, hot-pressed alumina or Rene-41 alloy, cylindrical specimens ¾″ in diameter and about ¼″ long are produced. In the use of ceramic or metal dies, provision must be made, such as by the use of permeable sleeves, for the escape of gases.

Tensile strength measurements on the oxide product were made by three point loading and by the diametral method. High speed photography was used to check the mode of failure. Electron fractographs were taken using platinum shadowed carbon replicas with the platinum deposited at an angle of incidence of about 20°. Magnesia surfaces were observed to be highly sensitive to air, moisture and/or carbon dioxide and replication was carried out immediately after fracture.

EXAMPLE 1

This example illustrates the preparation of fine-grained magnesia having an actual density greater than 99.90%.

In preliminary experiments, it was found that a magnesia of 99.95% purity, grain size $0.08\mu$, prepared by calcining basic magnesium carbonate at 1000° C. for 10 hours was surprisingly difficult to hot-compress by heating to temperature and then applying pressure afterwards. Similarly, magnesia of the same grain size prepared from the hydroxide was also resistant to hot-compression.

Fine-grained magnesias having an actual density approaching the theoretical were prepared as follows:

(A) Another sample of the magnesium hydroxide used in the preliminary experiments was heated at the rate of 6° C. per minute from room temperature to 1250° C. while under a pressure of 4,750 p.s.i. (B) Analytical grade magnesia of 99.0% purity was ball milled with distilled water for 5 minutes and washed with alcohol and ether. Pressure was applied at room temperature to this sample analyzing as $MgO \cdot 0.86H_2O$ which was heated to about 1500° C. at a heating rate of 14° C. per minute. (C) A sample of 97.5% pure, N.F. grade magnesium hydroxide was placed under 4,750 p.s.i. pressure and heated at a rate of 2° C. per minute up to 600° C. and then 10° C. per minute to about 1325° C. (D) Two additional samples of the N.F. grade hydroxide were rapidly heated by means of high frequency heating to 1050° C. in 15 minutes and 1225° C. in 20 minutes, respectively. The first sample showed a subsequent weight loss of only 0.6% when refined in a furnace at 1100° C. (E) A sample of 99.95% pure magnesium hydroxide was preheated at 250° C. for 17 hours and analyzed as $MgO \cdot 1.07H_2O$. Superior results were obtained when this material was heated to about 1250° C. at 4,750 p.s.i. or to about 1000° C. at 6,650 p.s.i. or to about 900° C. at 11,500 p.s.i.

The magnesia product obtained has a sub-micron grain size and is translucent and of high strength. The development and growth of the magnesia grains varies with temperature ranging from $0.03\mu$ at about 660° C. to about $0.1$–$0.2\mu$ at 900–1000° C. Although grain growth is more rapid at still higher temperatures, the average grain size is still comparatively small. Anisotropy in the product was observed only in the samples prepared at the lowest temperatures; these products have the smallest grain size thus far reported for magnesia prepared at these temperatures and pressures. As the temperature is raised, diffusion rapidly leads to an equiaxed structure; the grains become more definite and sharper in appearance as the density rises.

The large and rapid rise in relative density of the hydroxide sample at about 400–600° C. is exactly coincident with decomposition and the loss of water vapor as indicated by thermogravimetric measurements. The large increase in density observed is attributed to the application of pressure to the hydroxide during its decomposition.

Experiment B on partially hydrated magnesia did not give the large and rapid rise in relative density at 400–600° C. observed in the other experiments. Densification of the hydrated magnesia was obtained by pressure calcintering; but a temperature of about 1500° was required. This temperature should be contrasted with the much lower temperatures utilized with the various hydroxide samples. This effect, however, is related to the amount and kinds of impurities present. It must be stressed that in general higher purity levels lead to the best results. A fully hydrated magnesium oxide of analytical grade will achieve full density at 900° C. at 11,500 p.s.i.

The effect of varying the heating rate during pressure calcintering is minimal since the rate of the reaction appears to increase as the temperatures increases. Even in the case of the samples subjected to rapid high frequency heating there was no lowering of density of the oxide product due to trapping of gaseous water vapor.

Magnesia having 99.90% of its theoretical density was prepared at 11,000 p.s.i. in graphite-lined metal dies and at a maximum temperature of 900° C. using a heating rate of 6° C. per minute making the whole operation 140 minutes or so. Faster heating rates may be employed. Since no observable effect occurs below 350° C., the entire apparatus and reactant powder can be preheated (or not allowed to cool) to this temperature thereby reducing the operating time to 90 minutes or less. A preferred active hydroxide reactant with a grain size of about 1μ x 1μ x 50 A. (flakes) may be precipitated from highly pure magnesium nitrate with ammonium hydroxide solution. A prefiring of the hydroxide reactant to 250° C. further increases its activity, apparently by driving off trace impurities such as ammonium nitrate et cetera and removing easy nucleating sites. Active magnesium hydroxide can also be prepared by fully hydrating high purity magnesium oxide in cold water when impurities of this type must be absent.

EXAMPLE 2

This example illustrates the preparation of fine-grained alumina having an actual density approaching the theoretical. The various samples were prepared as follows: (A) Gibbsite, 99.9% Al(OH)$_3$ containing a small quantity of Bayerite, was ground in a ball mill with distilled water for 24 hours. (B) Amorphous aluminum hydroxide was precipitated from a boiling aqueous solution of aluminum nitrate by the addition of ammonium hydroxide. After firing overnight at 219° C., the sample analyzed as Al$_2$O$_3$·2.8H$_2$O. (C) Norstrandite Al$_2$O$_3$·3.2H$_2$O was prepared by aging a cold precipitate of the hydroxide for two weeks in excess ammonium hydroxide at a pH of 9. The air dried crystal was characterized by powder X-ray diffraction. (D) Commercially available Boehmite, AlO(OH).

In contrast to the behavior of brucite, the hot pressing of aluminum hydroxide gave a very rapid densification only at the higher temperatures especially just above 1000° C. where the gamma-alpha phase transformation is occurring. Alumina having a theoretical density was attained at about 1450° C. using heating rates of 6° and 14° C. per minute at a pressure of 4,750 p.s.i. Somewhat lower temperatures are required at higher pressures. Boehmite appears to be the preferred starting material on account of its higher density and lower vapor loss.

EXAMPLE 3

This example illustrates the preparation of fine-grained thoria having an actual density approaching the theoretical: Commercial thorium hydroxide was ground with water in a ball mill, the sample analyzed as ThO$_2$·3.1H$_2$O. The original sample was 98.5% pure. Even slight pre-decomposition of the hydroxide sample appears undesirable and careful handling of the hydroxide is necessary because it is metastable with respect to the oxide and tends to decompose even in boiling water.

The observed behavior of thorium hydroxide was more or less intermediate between that of brucite and the aluminum hydroxides. The rate of densification at 4,750 p.s.i. closely paralleled the loss of water, as measured thermographically, until water evolution ceased at about 800° C. Further densification occurred at about 1100° C. with the oxide rapidly approaching its theoretical density at about 1250° C.

Starting with commercial grade thorium hydroxide, thorium oxide of largely sub-micron grain size and having a density 98.5% of the theoretical was prepared by heating the hydroxide under a pressure of 4,750 p.s.i. to 1235° C. at the rate of 6° C. per minute over a period of 3 hours and 20 minutes. Faster rates of heating may be employed to obtain similar results. The observed grain conformation was somewhat discontinuous with the small grains below one micron in size and smaller than heretofore reported for thoria.

EXAMPLE 4

The mechanical strength values determined for the product of the present invention are compared with those listed in "Refractory Ceramics for Aerospace," American Ceramic Society, Columbus, Ohio (1964) and those obtained by Spriggs et al. Am. Ceram. Soc. Bull. 43, 572 (1964) using very careful sample treatment. The tests reported on the products of Examples 1, 2 and 3 did not involve the very careful alignment and surface polishing treatments needed to get unusually high test values. The diametral method of testing usually gives values about ⅔ those measured by bend tests.

| Oxide | Present method | Aerospace | Spriggs et al. |
|---|---|---|---|
| Alumina | [1] 74,900 | [2] 30–35,000 | [2] 50–90,000 |
| Thoria | [1] 10,800 | [2] 15,000 | [2] 80,000 |
| Magnesia | [2] 30,000 | [2] 23,000 | [2] 40,000 |

[1] Diametral. [2] Bend.

EXAMPLE 5

The temperatures required and the densities obtained using the process of the present invention are compared with the temperatures required for achievement of nearly full oxide density in the tables below:

| | Temperature, °C. | |
|---|---|---|
| Oxide | Present method | Ballard |
| Alumina | 1,450 | 1,650–1,750 |
| Thoria | 1,235 | 1,400–1,600 |
| Magnesia | 900 | 1,250–1,325 |

| | Density of oxide | | |
|---|---|---|---|
| Oxide | Present method | Ballard | Theoretical |
| Alumina | 3.96 | 3.968 | 3.96 |
| Thoria | 9.84 | 9.404 | 9.98 |
| Magnesia | 3.58 | 3.485 | 3.58 |

The values reported in U.S. Pat. 2,538,959 to Ballard for magnesia and alumina appear somewhat high. The density obtained by him for alumina is above the now accepted theoretical value probably because of the presence of heavier impurities such as iron in the sample. In the present work, even when using higher temperatures and pressures, no actual oxide product densities attained were greater than the theoretical value for that oxide.

The above-offered examples are intended to illustrate and not to limit the present invention. Other variations coming within the scope of the invention will be apparent to those skilled in the art. The present invention is as claimed.

I claim:

1. A method for the preparation of finely-grained ceramic magnesium, aluminum or thorium oxide having an actual density approaching the theoretical density which comprises heating the corresponding substantially pure hydroxide maintained at a pressure above 1500 p.s.i. to a temperature above its decomposition point while permitting water vapor to escape as it is formed.

2. A method according to claim 1 wherein the hydroxide is preheated at a temperature below its decomposition temperature.

3. A method according to claim 1 wherein the hydroxide is magnesium hydroxide.

4. A method according to claim 1 wherein the hydroxide is aluminum hydroxide.

5. A method according to claim 1 wherein the hydroxide is thorium hydroxide.

6. A process for manufacturing dense hard oxide products comprising: providing a charge consisting essentially of at least one compound which on heating to a temperature between about 300° C. and 1000° C. decomposes to yield at least one oxide selected from the group consisting of alumina, magnesia, beryllia, thoria and urania, said compound not having been previously heated to its said decomposition temperature; heating said charge to said decomposition temperature of between 300° C. and 1000° C. and at least while the decomposition is occurring, applying pressure to the charge while confined in a mold cavity, the application of pressure simultaneously with said heat initiated decomposition resulting in the shaping, strengthening and densifying of said charge; and recovering the resultant dense oxide product.

7. The process of claim 6 wherein said charge is heated while in the mold cavity.

8. The process of claim 6 in which, after applying pressure to said charge simultaneously with the heat initiated decomposition, the application of pressure is discontinued and the product is further heated to a temperature higher than the temperature to which it was initially heated to cause decomposition.

9. The process of claim 8 wherein pressure is applied to the product during the step of further heating it.

10. The process of claim 6 in which, after applying pressure to said charge simultaneously with the heat initiated decomposition, the product is further heated to a temperature higher than the temperature to which it was initially heated to cause decomposition and wherein pressure is applied to the product during the step of further heating it.

References Cited
UNITED STATES PATENTS 3,379,523    4/1968    Chaklader _____ 75—206

LELAND A. SEBASTIAN, Primary Examiner

U.S. Cl. X.R.

23—142, 201; 75—206, 226; 264—0.5, 332